(12) United States Patent
Orbach et al.

(10) Patent No.: US 10,579,672 B2
(45) Date of Patent: Mar. 3, 2020

(54) AUDIO SNIPPET INFORMATION NETWORK

(71) Applicants: David M. Orbach, Livingston, NJ (US); Evan John Kaye, Short Hills, NJ (US)

(72) Inventors: David M. Orbach, Livingston, NJ (US); Evan John Kaye, Short Hills, NJ (US)

( * ) Notice: Subject to any disclaimer, the term of this patent is extended or adjusted under 35 U.S.C. 154(b) by 0 days.

(21) Appl. No.: 15/083,705

(22) Filed: Mar. 29, 2016

(65) Prior Publication Data

US 2017/0289793 A1 Oct. 5, 2017

Related U.S. Application Data

(60) Provisional application No. 62/142,794, filed on Apr. 3, 2015.

(51) Int. Cl.
*G06F 16/68* (2019.01)
*H04W 68/00* (2009.01)
*G06F 16/638* (2019.01)

(52) U.S. Cl.
CPC .......... *G06F 16/68* (2019.01); *H04W 68/005* (2013.01); *G06F 16/639* (2019.01)

(58) Field of Classification Search
CPC ............... G06F 17/30769; G06F 3/165; G06F 17/30755; G06F 17/30743; G11B 27/105; G11B 27/034; G11B 2020/10768; H04N 21/4331; H04N 21/8106; H04N 21/8456; H04N 21/47202
See application file for complete search history.

(56) References Cited

U.S. PATENT DOCUMENTS

| | | | |
|---|---|---|---|
| 2005/0231513 A1* | 10/2005 | LeBarton | ................ G06T 13/00 345/473 |
| 2008/0183840 A1* | 7/2008 | Khedouri et al. | |
| 2009/0012944 A1* | 1/2009 | Rodriguez | ........ G06F 17/30864 |
| 2013/0085586 A1* | 4/2013 | Parekh | ................ G11B 27/034 700/94 |

\* cited by examiner

*Primary Examiner* — Marsha D Banks Harold
*Assistant Examiner* — Dharmesh J Patel
(74) *Attorney, Agent, or Firm* — Pearl Cohen Zedek Latzer Baratz LLP

(57) ABSTRACT

This invention describes an audio snippet exchange network that allows people to subscribe to audio snippets that are published by other members on the network. The audio snippets may also have user contributed metadata related to them, such that the recipients can search a library of audio snippets and play back only those that match the search term. Oftentimes people want to take advantage of communication via social networks but are presently engaged in an activity such as driving or watching a live event. This audio snippet exchange network allows the person to have a largely uninterrupted experience while still publishing and consuming audio messages.

13 Claims, 8 Drawing Sheets

AUDIO SNIPPET INFORMATION NETWORK

CROSS REFERENCE TO RELATED APPLICATIONS

This application claims priority from U.S. Provisional Patent Application No. 62/142,794, filed Apr. 3, 2015, which is incorporated herein by reference.

The present invention relates to the field of microblogging on a network system. The practice of exchanging short messages that are typically tagged with metadata containing topic information oftentimes in the form of hastags (e.g. #newyork, #election), data tied to people (e.g. @johnsmith, @lucyjones).

BACKGROUND OF THE INVENTION

The practice of exchanging short messages that are typically tagged with metadata containing topic information oftentimes in the form of hastags (e.g. #new York, #election) and data tied to people (e.g. @johnsmith, @lucyjones) has become popular. Messages are typically alphanumeric text messages that are constrained to a given length. While it is possible to attach photos and audio recordings to these messages by the way of links, the platforms that are common nowadays, e.g. Twitter, are not optimized for an audio experience.

SUMMARY OF THE INVENTION

The platform provides a vehicle for people to easily record and consume short audio messages. Messages can be tagged by topic, and also be geotagged if the recording user opts to do this. People listening to the messages can search historical recordings on the platform for items of interest or listen to the recordings "live" just after they were recorded. The drawings illustrate a website interface to the platform but it can also be utilized through mobile smartphones, or any other devices that communicate with the network that are capable of playing audio, recording audio, or both. The platform can additionally be accessed through the telephone system for recording or playing.

In a preferred embodiment, audio files are streamed to a network server and hosted on a content distribution network. Metadata regarding these files are stored in a database. A search query pulls a playlist from the database and a client machine then requests the audio data in sequence from the content distribution network while displaying a feed in reverse chronological order. The listener can skip over messages, and also randomly access certain messages on the feed.

Listeners may rebroadcast a message, under their identity while referencing the original recorder—thereby allowing those people connected (or following) a person to listen to those messages that the person has rebroadcast. A reply button integrated to the play experience allows for quick messages to be recorded while listening to others, and also quick replies to other posted messages.

Embodiments of the invention may include an apparatus for exchanging audio snippet information, including a processor configured to: record a first audio snippet, in response to a user selecting a record button; receive searchable metadata from the user and assign the searchable metadata to the first audio snippet; unload the first audio snippet to a network; search the network for audio snippets and display a list of audio snippets, in response to a query from the user; and play a second audio snippet, in response to the user selecting the second audio snippet from the list of audio snippets.

In some embodiments, the processor may be further configured to record an introductory snippet, wherein the introductory snippet is played before the first audio snippet, in response to a device accessing the first audio snippet via the network. In some embodiments, an audible tone may be played after the introductory snippet and before the first audio snippet, in response to the device accessing the first audio snippet via the network. In some embodiments, the processor may be further configured to disable recording of audio snippets until the first audio snippet is uploaded or deleted, in response to the first audio snippet being recorded.

In some embodiments, the process may be further configured to sequentially play snippets from the list of audio snippets. In some embodiments, the processor may be further configured to randomly play snippets from the list of audio snippets. In some embodiments, the list of audio snippets may be arranged by topic. In some embodiments, the processor may be further configured to display account holders that are actively following the user and to enable the user to selectively follow the account holders.

Embodiments of the invention may include a method for exchanging audio snippet information, including: recording a first audio snippet, in response to a user selecting a record button; receiving searchable metadata from the user and assigning the searchable metadata to the first audio snippet; uploading the first audio snippet to a network; searching the network for audio snippets and displaying a list of audio snippets, in response to a query from the user; and playing a second audio snippet, in response to the user selecting the second audio snippet from the list of audio snippets.

Some embodiments may further include recording an introductory snippet, wherein the introductory snippet is played before the first audio snippet, in response to a device accessing the first audio snippet via the network. Some embodiments may further include playing an audible tone after the introductory snippet and before the first audio snippet, in response to the device accessing the first audio snippet via the network. Some embodiments may further include disabling recording of audio snippets until the first audio snippet is uploaded or deleted, in response to the first audio snippet being recorded. Some embodiments may further include sequentially playing snippets from the list of audio snippets. Some embodiments may further include randomly playing snippets from the list of audio snippets.

In some embodiments, the list of audio snippets may be arranged by topic. Some embodiments may further include displaying account holders that are actively following the user and enabling the user to selectively follow the account holders. In some embodiments, the method may be executed by a processor configured to execute instructions stored on a non-transitory storage medium.

DETAILED DESCRIPTION OF DRAWINGS

Figure 1:
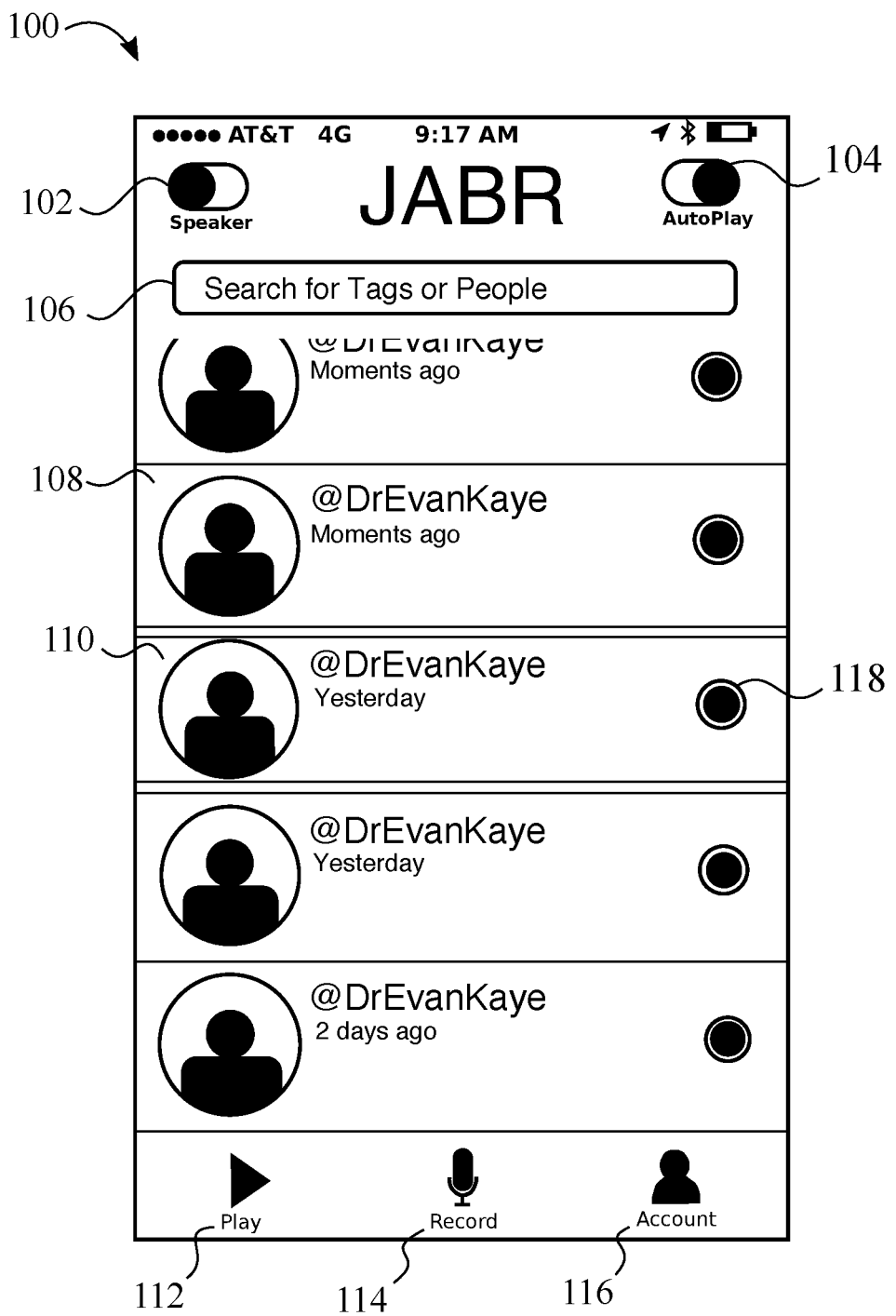
FIG. 1 shows a screenshot of the active Play tab containing a feed of audio snippets.

With reference to FIG. 1, a screenshot 100 of the active Play tab containing a feed of audio snippets is shown. It contains a Speaker switch 102 which allows the user to direct the audio to the mobile phone's speaker when this is switched on, or to the earpiece on the phone when it is switched off. It has an AutoPlay switch 104 which sets the application to sequentially play through the audio snippets when it is switched on, or to only play the tapped audio snippet when it is switched off, without continuing onto the following one. The Search area 106 allows a user to filter the audio snippets in the feed by topic (if the people posting the audio snippets included a topic), or to filter by the user's alias tag that is typically prefixed with the "@" symbol. Each non-playing audio snippet is indicated by a flat row 108, and the selected playing audio snipped is raised 110 in appearance. Each dot 118 on the right side of the audio snippet row indicated whether the user has previously listened to that specific audio snippet before, or not, by changing the appearance from an on light to a vacant light. The user selects the audio snippet they wish to hear by tapping on the applicable area. The bottom of the screen has tabs: Play 112, Record, 114, and Account 116 as by convention will load the matching views onto the screen.

Figure 2:
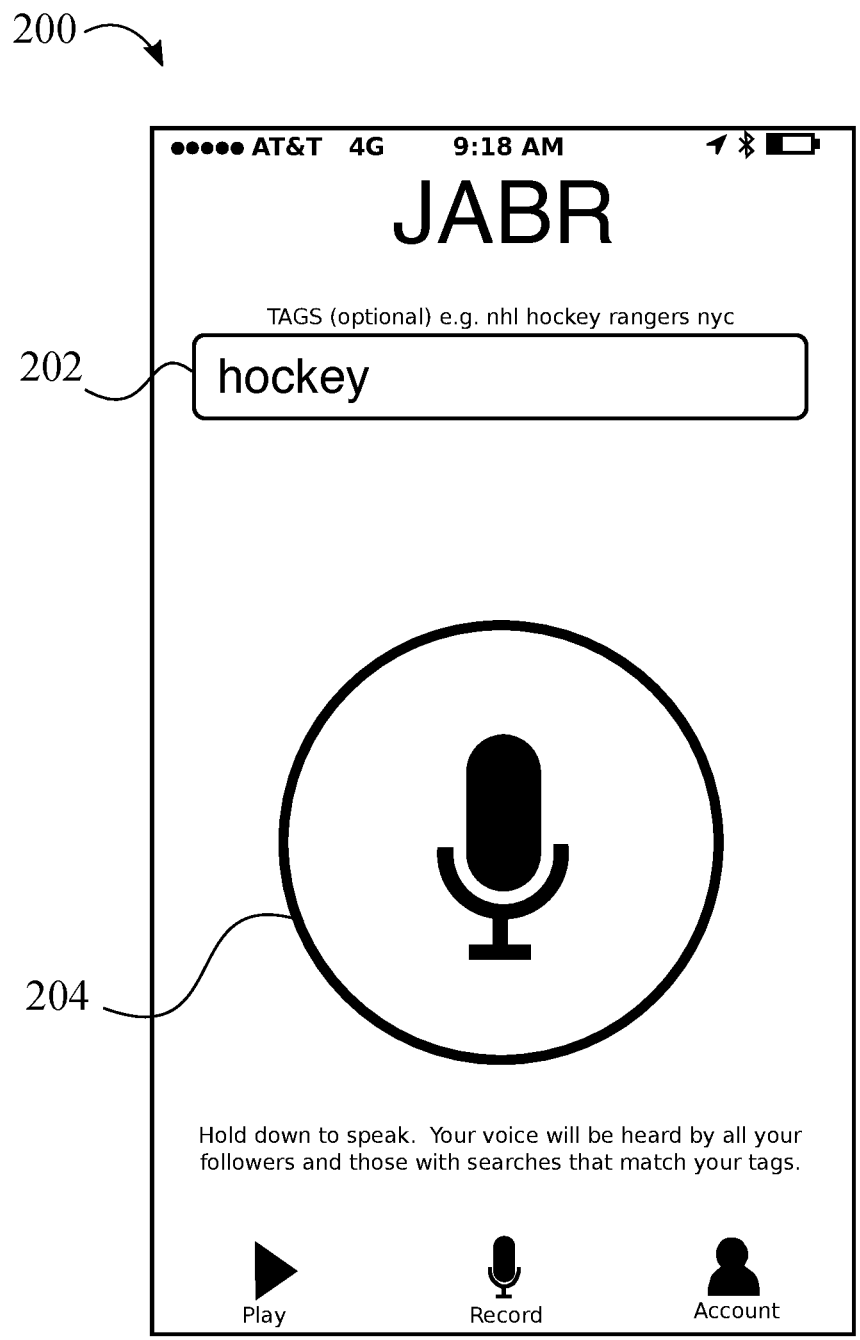
FIG. 2 shows a screenshot of the Record tab containing the record button.

With reference now to FIG. 2, a screenshot 200 of the active Record tab is shown which is where the user records an audio snippet. It has a tags area 202, and a record button 204. The user inputs any searchable metadata they should like to include with the audio snippet in the tags area 202 and then depresses the record button 204 while speaking.

Figure 3:
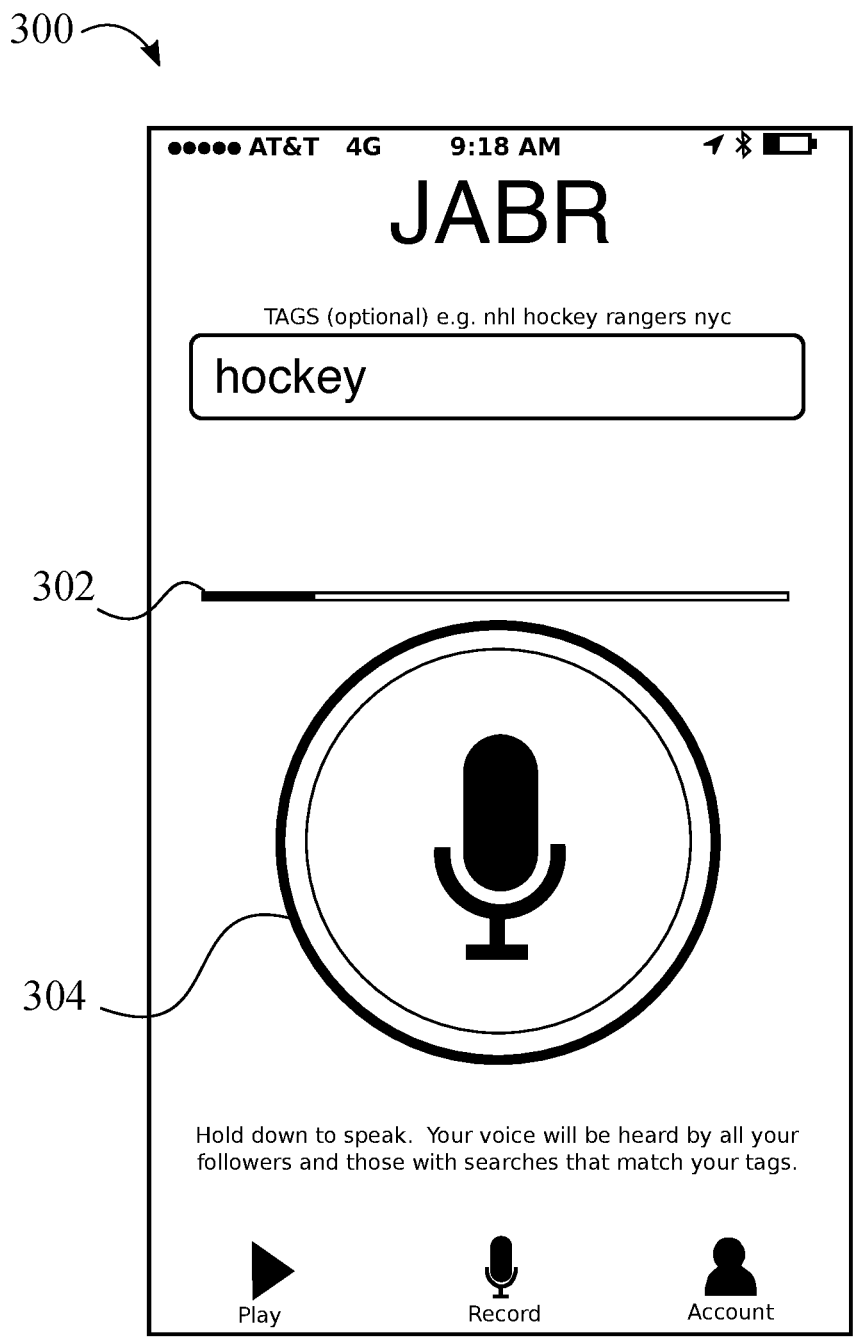
FIG. 3 shows a screenshot of the Record tab containing the depressed record button while someone records.
Figure 4:
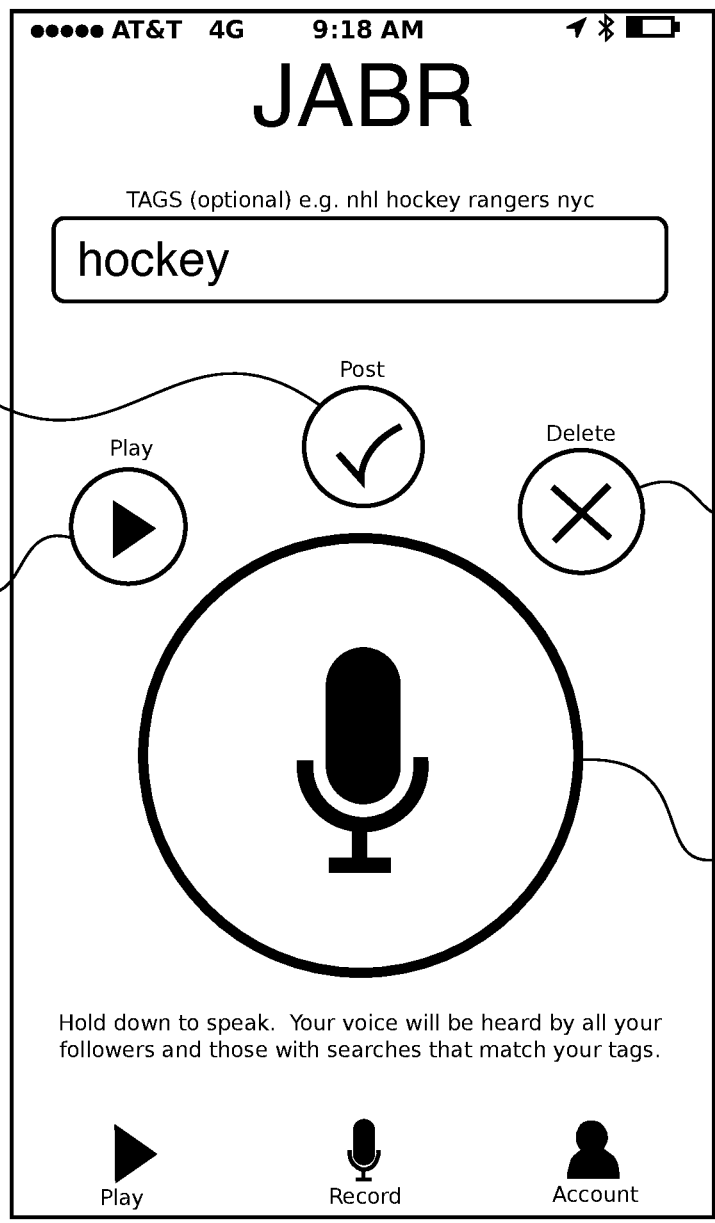
FIG. 4 shows a screenshot of the Record tab containing an inactive record button while the application awaits user confirmation.

With reference to FIG. 3, a screenshot 300 of the active Record tab is shown with a timeline 302 and a depressed record button 304. The timeline indicates how long the user has recorded in relation to the maximum allowed recording (8 seconds). The color on the timeline changes when the user has surpassed the minimum allowed time for the recording (3 seconds). With reference now to FIG. 4, a screenshot 400 of the active Record tab is shown with a Play button 402 to allow the user to hear the audio snippet they had just recorded, a Post button 404 they press when they are satisfied with the audio snippet so it can be sent to the network, and a Delete button 406 that the user can use to discard the audio clip they had just recorded without sharing with anyone. The record button 408 is disabled while the three smaller buttons above it are in view to force the user to make a decision about the audio clip they have recorded before being allowed to record another one.

Figure 5:
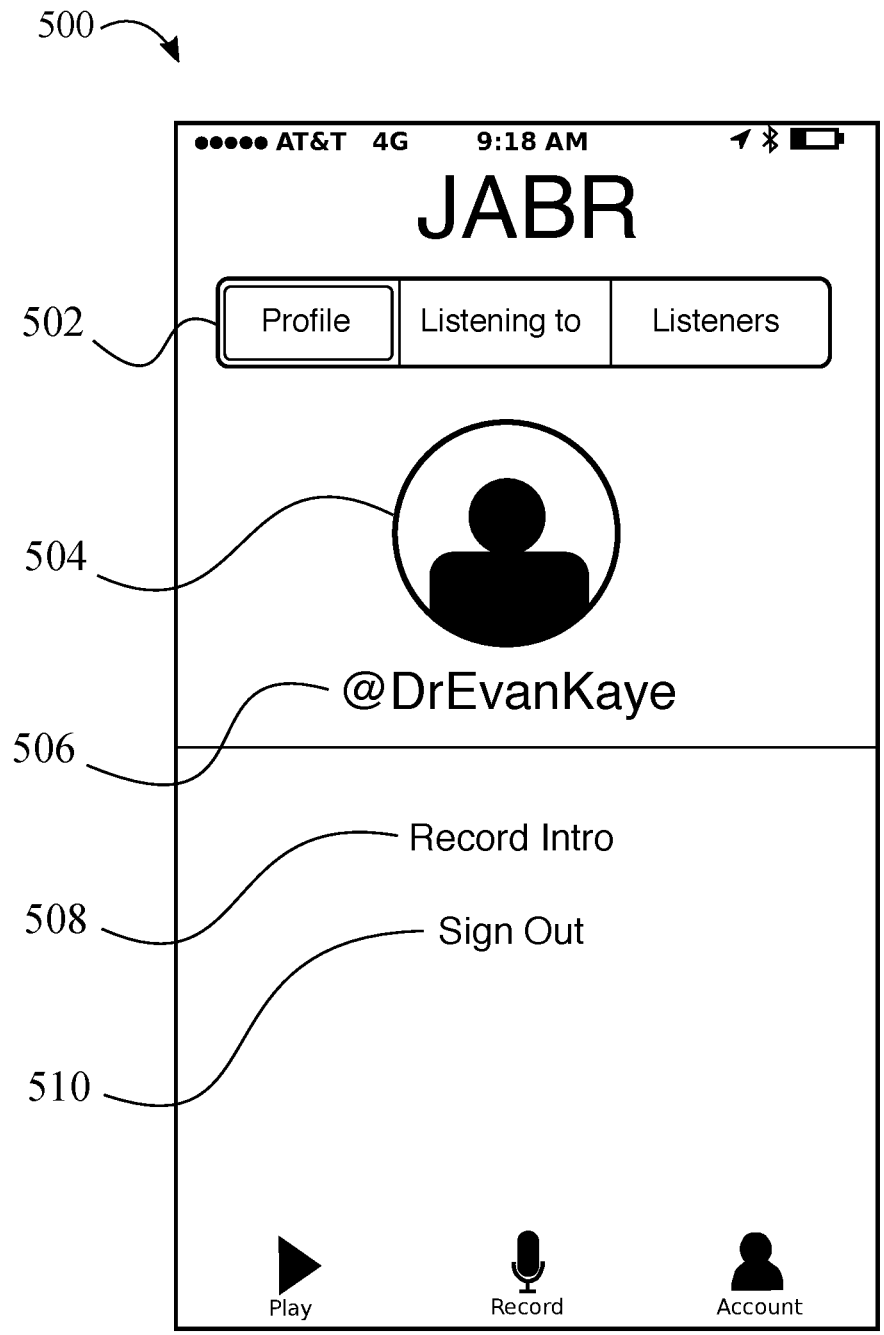
FIG. 5 shows a screenshot of the Account tab with the Profile view active.

With reference now to FIG. 5, a screenshot 500 of the Account tab with the Profile view active is shown with a highlighted Profile tab 502, a photo of the user 504 that is currently logged into the mobile application and the user's alias 504 that was selected by them when they created the account. They have the ability to record an intro 508 that is a 2 second audio snippet that is played before every audio snippet played back to other people. The exception is when more than one audio snippets are played sequentially that have been recorded by the same user. In this case the Intro audio is played only one. An audible tone is used to separate postings between playbacks so that the listener can differentiate between recordings. A Sign Out 510 button is also shown which allows the user to sign out of the account on the application.

Figure 6:
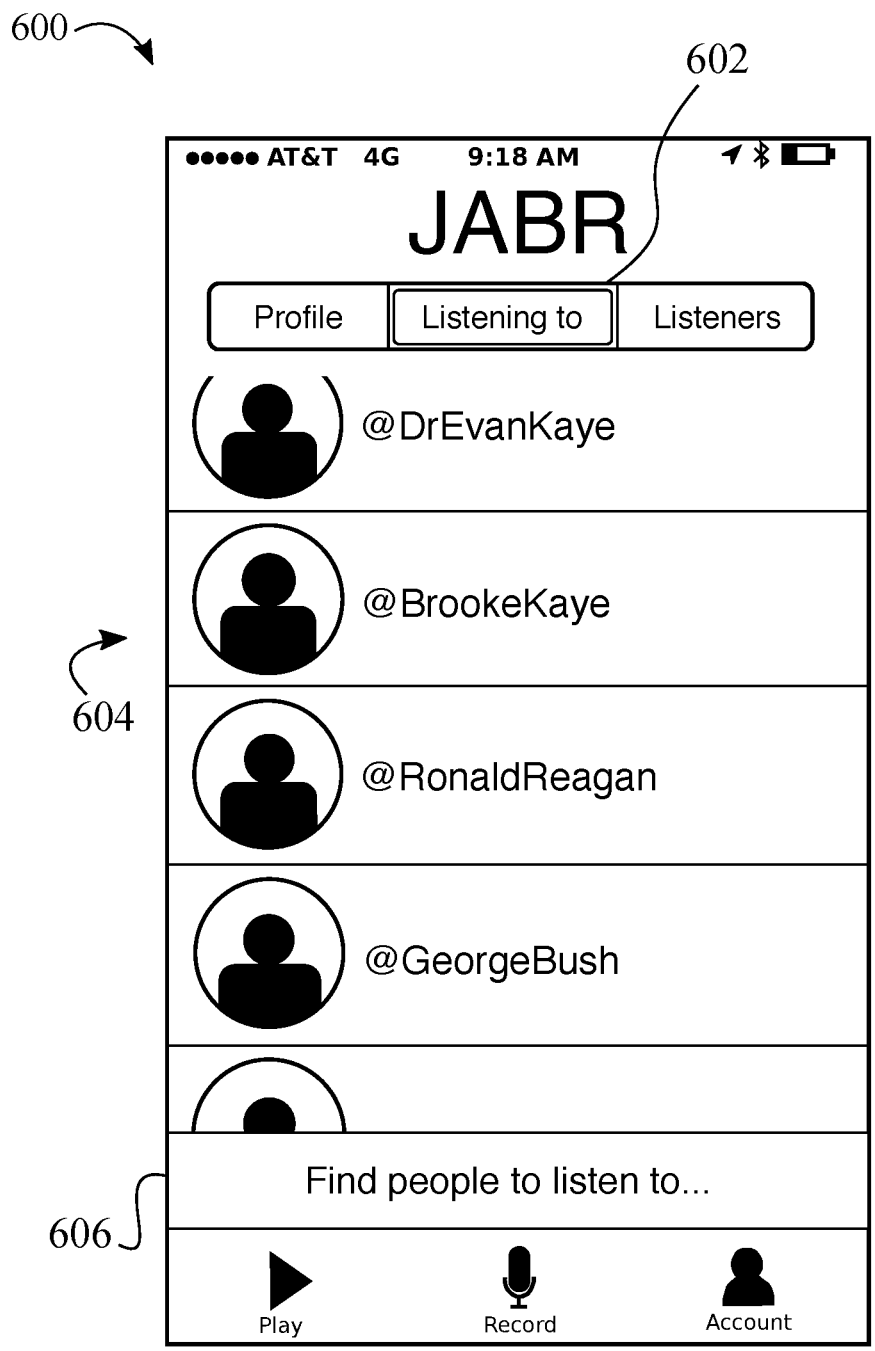
FIG. 6 shows a screenshot of the Account tab with the Listening To view active.

With reference to FIG. 6 a screenshot of the Account tab with the Listening To tab 602 highlighted is shown. The listing 604 shows all the account holders that the user is following and will therefore show up in their feed by default. A search button 606 allows the user to search for additional people to follow.

Figure 7:
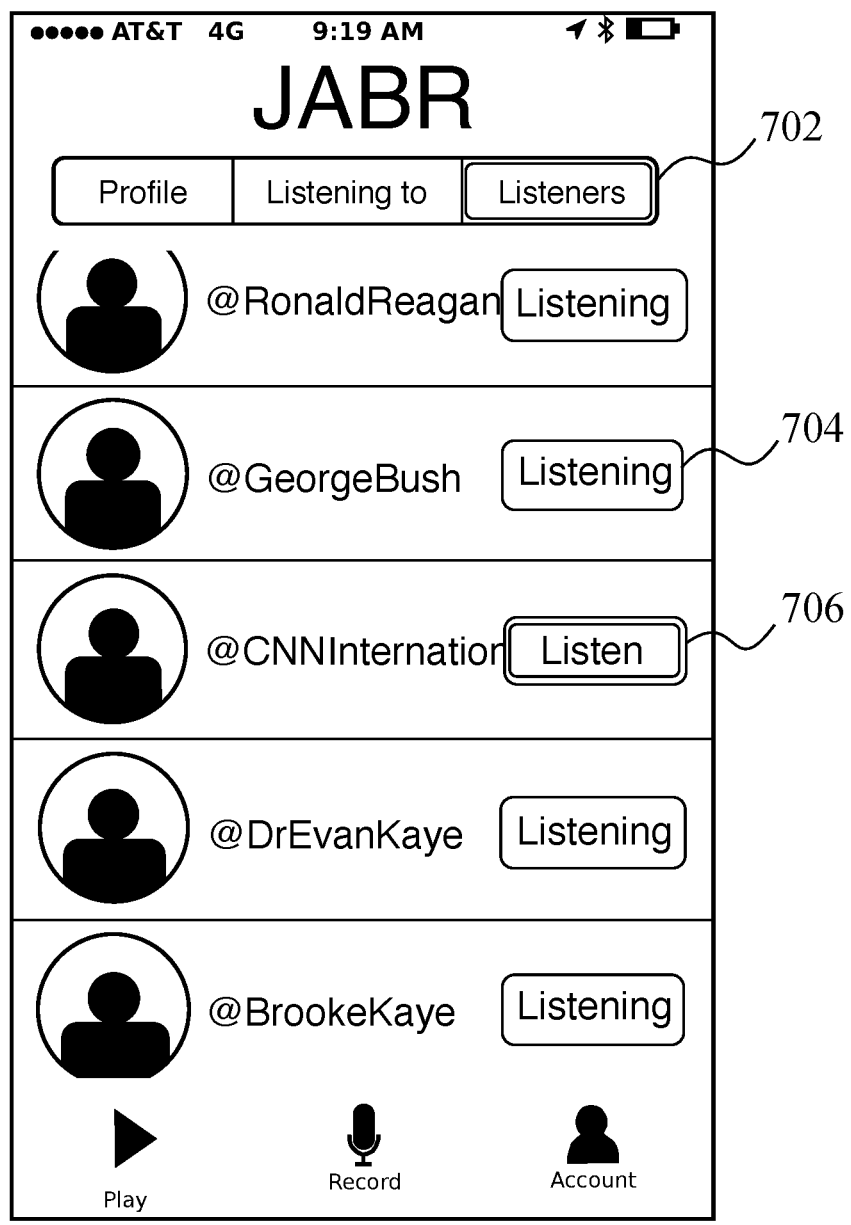
FIG. 7 shows a screenshot of the Account tab with the Listeners view active.

With reference to FIG. 7 a screenshot of the Account tab with the Listeners view active 702 is shown. This shows the user the other account holders that are actively following them and allows the user the ability to follow the people back by tapping the Listen button 706 which will change the status to Listening 704.

Figure 8:
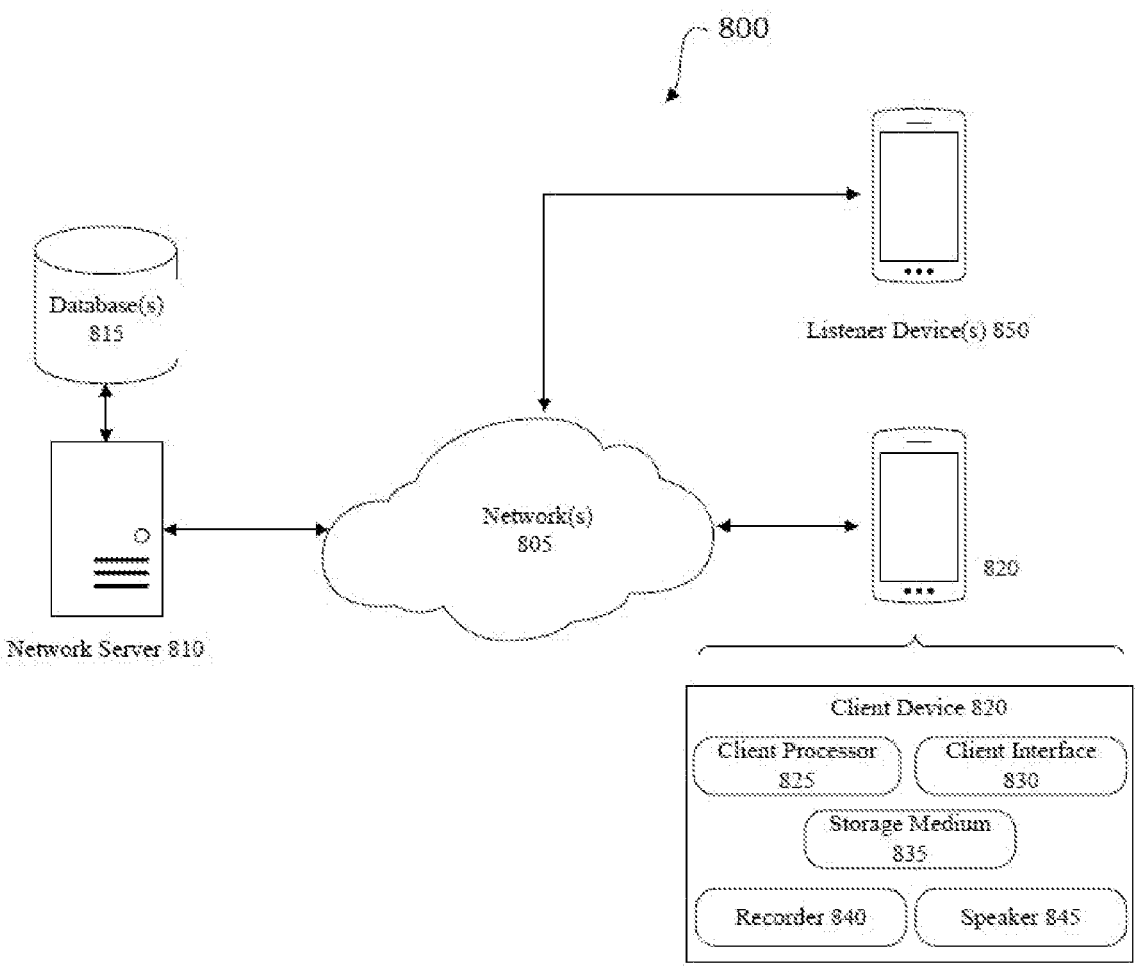
FIG. 8 shows a high level diagram illustrating an example configuration of a system 800 for exchanging audio information, according to at least one embodiment of the invention.

FIG. 8 shows a high level diagram illustrating an example configuration of a system 800 for exchanging audio snippet information, according to at least one embodiment of the invention. System 800 includes network 805, which may include a content distribution network and/or telephone system network. System 800 also includes a network server 810 construction in accordance with one or more embodiments of the invention in some embodiments, network server 810 may be hosted on content distribution network 805. In accordance with further embodiments of the invention, system server 810 may be connected to one or more database(s) 815. In some embodiments, database 815 may store metadata regarding audio files audio files streamed to a network server 810 and hosted on a content distribution network such as network 805. As described herein, a mobile smartphone or any other client device 820 may be connected to the network 805. Client device 820 may be any device that is able to communicate with the network 805 and is capable of playing audio, recording audio, or both. Client device 820 may include a processor, such as client processor 825, a screen, such as client interface 830, a storage medium, such as storage medium 835, a recorder 840 for recording audio snippets, and a speaker 845 for listening to audio snippets. Additional devices of other users, such as listener device 850, may likewise include similar features.

In a preferred embodiment, audio files are streamed to a network server and hosted on a content distribution network. Metadata regarding these files are stored in a database. A search query pulls a playlist from the database and a client machine then requests the audio data in sequence from the content distribution network while displaying a feed in reverse chronological order. The listener can skip over messages, and also randomly access certain messages on the feed.

Listeners may rebroadcast a message, under their identity while referencing the original recorder—thereby allowing those people connected (or following) a person to listen to those messages that the person has rebroadcast. A reply button integrated to the play experience allows for quick messages to be recorded while listening to others, and also quick replies to other posted messages.

The invention claimed is:

1. An apparatus for exchanging audio snippet information, comprising: a processor configured to:
   record a first audio snippet, in response to a user selecting a record button;
   receive searchable metadata from the user and tag the first audio snippet with the searchable metadata;

upload the first audio snippet and the searchable metadata to a network;
in response to a search query from the user:
search the network for audio snippets,
pull a playlist of audio snippets from a database, each of the audio snippets in the playlist having been recorded by other users and tagged with searchable metadata relating to the other users, and
display the playlist of audio snippets in reverse chronological order;
play a second audio snippet, in response to the user selecting the second audio snippet from the playlist of audio snippets; and
sequentially play the playlist of audio snippets in response to the user selecting automatic sequential playback of the playlist of audio snippets;
wherein the processor is further configured to display account holders that are actively following the user and to enable the user to selectively follow the account holders; and
wherein only audio snippets of account holders being selectively followed by the user are displayed and played in the playlist.

2. The apparatus of claim 1, wherein the processor is further configured to record an introductory snippet, wherein the introductory snippet is played before the first audio snippet, in response to a device accessing the first audio snippet via the network.

3. The apparatus of claim 2, wherein an audible tone is played after the introductory snippet and before the first audio snippet, in response to the device accessing the first audio snippet via the network.

4. The apparatus of claim 1, wherein the processor is further configured to disable recording of audio snippets until the first audio snippet is uploaded or deleted, in response to the first audio snippet being recorded.

5. The apparatus of claim 1, wherein the processor is further configured to randomly play snippets from the playlist of audio snippets.

6. The apparatus of claim 1, wherein the playlist of audio snippets is arranged by topic.

7. A method for exchanging audio snippet information, comprising:
recording a first audio snippet, in response to a user selecting a record button;
receiving searchable metadata from the user and tagging the first audio snippet with the searchable metadata;
uploading the first audio snippet and the searchable metadata to a network;
in response to a search query from the user:
searching the network for the audio snippets,
pulling a playlist of audio snippets from a database, each of the audio snippets in the playlist having been recorded by other users and tagged with searchable metadata relating to the other users; and
displaying the playlist of audio snippets in reverse chronological order;
playing a second audio snippet, in response to the user selecting the second audio snippet from the playlist of audio snippets; and
sequentially playing the playlist of audio snippets in response to the user selecting automatic sequential playback of the playlist of audio snippets;
wherein the processor is further configured to display account holders that are actively following the user and to enable the user to selectively follow the account holders; and
wherein only audio snippets of account holders being selectively followed by the user are displayed and played in the playlist.

8. The method of claim 7, further comprising recording an introductory snippet, wherein the introductory snippet is played before the first audio snippet, in response to a device accessing the first audio snippet via the network.

9. The method of claim 8, further comprising playing an audible tone after the introductory snippet and before the first audio snippet, in response to the device accessing the first audio snippet via the network.

10. The method of claim 7, further comprising disabling recording of audio snippets until the first audio snippet is uploaded or deleted, in response to the first audio snippet being recorded.

11. The method of claim 7, further comprising randomly playing snippets from the playlist of audio snippets.

12. The method of claim 7, wherein the playlist of audio snippets is arranged by topic.

13. The method of claim 7, wherein the method is executed by a processor configured to execute instructions stored on a non-transitory storage medium.

* * * * *